United States Patent Office 3,498,992
Patented Mar. 3, 1970

---

3,498,992
SUBSTITUTED 1,2,3,6-TETRAHYDRO-4-PYRIDINE ACETIC ACID AMIDES
Hans Herbert Kuhnis, Hugo Ryf, and Rolf Denss, Basel, Switzerland, assignors to Geigy Chemical Corporation, Ardsley, N.Y., a corporation of New York
No Drawing. Continuation-in-part of application Ser. No. 520,093, Jan. 12, 1966. This application Sept. 29, 1967, Ser. No. 671,592
Claims priority, application Switzerland, Jan. 15, 1965, 603/65
Int. Cl. C07d 29/38; A61k 27/00
U.S. Cl. 260—295  4 Claims

ABSTRACT OF THE DISCLOSURE

The compounds are of the class of 1,2,3,6-tetrahydropyridine derivatives substituted in 4-position by an amidoalkyl group useful as analgesic and antitussive agents. An illustrative embodiment is 1-methyl-1,2,3,6-tetrahydro-4-pyridine acetic acid ethylamide.

CROSS-REFERENCE

This is a continuation-in-part application of pending application Ser. No. 520,093, filed Jan. 12, 1966, now U.S. Patent No. 3,408,357, which in turn is a continuation-in-part application of pending application Ser. No. 382,955 filed July 15, 1964, now U.S. Patent No. 3,366,638.

DESCRIPTION OF INVENTION

The present invention relates to compounds which may be characterized by the following Formula I

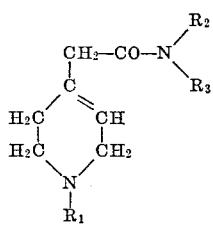

(I)

wherein:

$R_1$ represents alkyl of at most 4 carbon atoms, alkenyl of at most 4 carbon atoms of phenylalkyl of a total of at most 10 carbon atoms, from 0 to 3 of which can be alkyl preferably as methyl substituent, linked to ring carbon atoms of the phenylalkyl;
$R_2$ represents hydrogen, alkyl of at most 6 carbon atoms or phenyl; and
$R_3$ represents hydrogen or alkyl of at most 3 carbon atoms and their salts with inorganic and organic acids, all of which are useful analgesic and antitussive agents.

Particularly good antitussive properties are to be found in compounds falling under the formula

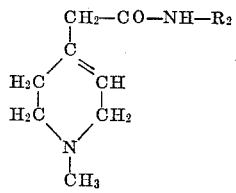

wherein $R_2$ has the same meaning as defined above.

In the above-described compounds $R_1$ is, for example, alkyl such as methyl, ethyl, n-propyl, isopropyl, n-butyl, isobutyl or sec. butyl; alkenyl such as allyl, crotyl, or methallyl, or phenylalkyl such as benzyl, 2-phenylethyl, 3-phenylpropyl or 4-phenylbutyl;

$R_2$ is, for example, hydrogen, methyl, ethyl, propyl, isopropyl, butyl, isobutyl, sec. butyl, tert. butyl, pentyl, isopentyl, hexyl, or phenyl;

$R_3$ is hydrogen, methyl, ethyl, propyl, or isopropyl.

Furthermore, the present invention relates to novel compositions containing a compound of the above-mentioned formula for producing analgesic and antitussive effects in warm-blooded animals, especially mammals when administered in therapeutic doses.

To produce compounds of Formula I and their salts with inorganic and organic acids, an acid of the general Formula II

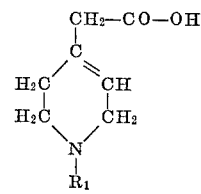

(II)

wherein $R_1$ has the same meaning as defined above, or a reactive functional derivative thereof is reacted with an amine of the general Formula III

(III)

wherein $R_2$ and $R_3$ have the same meaning as defined above, or with a reactive functional derivative thereof. The obtained compounds can be converted, if desired, into a salt with an inorganic or organic acid.

To perform the above process, for example, an acid of the general Formula II is reacted with an amine of the general Formula III in the presence of a carbodiimide such as dicyclohexyl carbodiimide, in an inert solvent such as tetrahydrofuran. Also, acids of the general Formula II can be reacted with amines of the general Formula III to form ammonium salts which, on heating with agents which split off water, such as phosphorus pentoxide, in inert organic solvents, e.g. benzene or toluene, are converted into amides of the general Formula I.

Low alkyl esters such as the methyl or ethyl esters of the acids of the general Formula II yield the correspondingly substituted amides of the general Formula I on heating with amines of the general Formula III. Other suitable reactive functional derivatives of acids of the general Formula II are the halides as such or as hydrohalides, and also anhydrides, particularly the mixed anhydrides with carbonic acid half esters. These functional derivatives are reacted with an amine of the general Formula III, preferably in the presence of an acid binding agent, e.g. a strong tertiary organic base such as triethylamine, pyridine or s-collidine, which in excess can also serve as reaction medium, or an excess of the reaction component of the general Formula III can be used in the presence or absence of an inert organic solvent such as benzene, tetrahydrofuran or dimethyl formamide. As modification of the reaction of acid halides with amines of the general Formula III in the presence of acid binding agents, the reaction of the acid halides with suitable tertiary organic bases, particularly triethylamine, in an inert organic solvent, removal by filtration of the hydrochloride formed and the reaction of the ketene or ketene dimer present in the solution with the desired amine of the general Formula III can be mentioned.

Reactive esters of acids of the general Formula II are, e.g. their p-nitrophenyl ester and cyanomethyl ester which can be reacted with amines of the general Formula III in inert organic solvents, if necessary with heating. The 1-imidazolides of the acids mentioned are reacted under similar conditions with amines of the general Formula III.

As reactive functional derivatives of amines of the general Formula III which can be reacted direct with acids of the general Formula II, the isocyanates and isothiocyanates derived from amines of the general Formula III in which $R_3$ is a hydrogen atom, can be mentioned. These are heated with the acids of the general Formula II until the equimolar amount of carbon dioxide or carbon oxysulphide has been liberated. The reactions with isocyanates and isothiocyanates can be performed in the presence or absence of an inert organic solvent having a sufficiently high boiling point or range. Instead of isocyanates, also precursors thereof can be used, i.e. in particular, the azides of carboxylic acids of formula $R_2$—COOH can be reacted with acids of the general Formula II while heating in suitable inert organic solvents. Further, N-chlorocarbonyl derivatives, for example, of amines of the general Formula III, particularly those in which the radicals $R_2$ and $R_3$ are not hydrogen, are reacted with salts, e.g. alkali metal salts, of acids of the general Formula II in the presence or absence of inert organic solvents, and the reaction mixtures are heated until the equimolar amount of carbon dioxide has been liberated from the carboxylic acid-carbamic acid anhydrides which have primarily been formed. In the same way, sulphurous acid monoalkyl esters amides and phosphoric acid phenylene diester amides can be derived from amines of the general Formula III wherein the radicals $R_2$ and $R_3$ are not hydrogen; on reaction with acids of the general Formula II in organic solvents such as pyridine, dioxan or dimethyl formamide or benzene, these yield the desired amides of the general Formula I.

Some acids of the general Formula II are known and others can be produced in an analogous manner, in particular by condensing 4-piperidones substituted according to the definition of $R_1$ with cyanoacetic acid alkyl esters according to Knoevenagel, for example by boiling in the presence of ammonium acetate and acetic acid in benzene, and hydrolysing the N-substituted 4-piperidylidene cyanoacetic acid alkyl esters formed with simultaneous decarboxylation and water cleavage, for example by boiling with concentrated hydrochloric acid. The acids of general Formula II can be produced in another way by condensing 1-substituted 4-piperidones with α-bromoacetic acid alkyl esters by means of zinc according to Reformatsky to form hydroxy esters of the general Formula IV

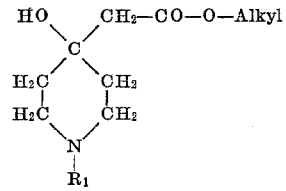

(IV)

wherein $R_1$ has the meaning given above, and the alkyl radical is preferably an ethyl or methyl radical, then splitting off water and hydrolysing, provided that the low alkyl esters of acids of the general Formula II obtained have not to be reacted direct with amines of the general Formula III.

Compounds of the general Formula I and their salts with inorganic and organic acids are produced according to a further process by treating an amide of the general Formula V

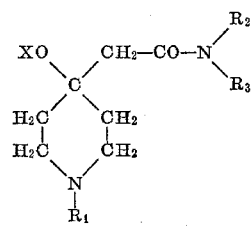

(V)

wherein X represents hydrogen or an acyl radical, and $R_1$, $R_2$ and $R_3$ have the meanings given in the general Formula I, with an acid binding agent or an agent which splits off water depending on the meaning of X, or by subjecting the amide to a sufficiently high temperature to split off X—OH and, if desired, converting the compound obtained of the general Formula I into a salt with an inorganic or organic acid. An acyl radical X is preferably that of a low alkanoic acid, such as, the acetyl or propionyl radical, which can be easily introduced, e.g. by treating compounds of the general Formula V containing a hydrogen atom as X with acetanhydride or propionic acid anhydride at room temperature to moderately elevated temperature.

Due to the linkage of the hydroxyl group or the acyloxy group to a tertiary carbon atom, the splitting off of water or of acid can be done with most varied agents even under relatively mild conditions.

To split off water or acid, for example, the compounds of the general Formula V are heated with organic bases such as quinoline, lutidine or collidine, or particularly the free hydroxy compounds, are treated with inorganic acid anhydrides and halides such as phosphorus pentoxide, phosphorus oxychloride or thionyl chloride in suitable organic solvents such as chloroform at the boiling temperature thereof, or they are treated with organic acids, acid anhydrides or acid halides such as formic acid, oxalic acid, p-toluene sulphonic acid, acetanhydride, phthalic acid anhydride, acetyl chloride and acetyl bromide at a moderately raised to boiling temperature of the reactant or of the solvent. Other suitable agents for splitting off water are, e.g. potassium sulphate, dimethyl sulphoxide and ion exchanger resins, e.g. condensation products of phenyl sulphonic acid and formaldehyde.

Amides of the general Formula V can be produced, for example, by reacting the hydroxy esters of the general Formula IV mentioned above which can be obtained by Reformatsky condensation, with amines of the general Formula III analogously to the first production process mentioned for the compound of the general Formula I. Instead of alkyl esters, also the corresponding free acids as well as other reactive functional derivatives thereof can be used for the reaction with amines of the general Formula III, but it should be remembered that water can be split off either when modifying alkyl esters of the general Formula III depending on the reaction conditions and any condensing agents used. If this occurs when an alkyl ester is being converted into the free acid or into another reactive functional derivative thereof, an acid of the general Formula II or a derivative thereof is obtained and the subsequent reaction with an amine of the general Formula III corresponds to the first production process mentioned for the compounds of the general Formula I. If it occurs—substantially completely however—during the reaction with the amine, then a combination of the first and second production processes mentioned occurs. If, however, water is only partially split off in any of the reaction steps leading from the esters of general Formula IV to the amides, then the crude amide obtained can be treated with an agent splitting off water or subjected to conditions which split off water corresponding to the second production process mentioned and, in this way, converted into a uniform reaction product of the general Formula I.

Compounds of the general Formula I and their salts with inorganic and organic acids are produced by a third process by partially reducing analogous pyridinium compounds of the general Formula VI

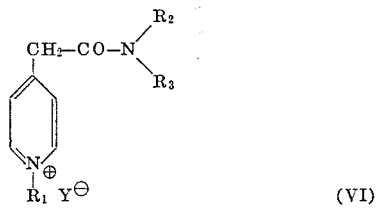

wherein:

$Y^\ominus$ represents the hydroxyl ion, a monovalent anion or the normal equivalent of a polyvalent anion, and $R_1$, $R_2$ and $R_3$ have the meanings given above, but $R_1$ is preferably the methyl radical or a radical bound by way of the methylene group, and, if desired, converting the compounds of the general Formula I obtained into salts with inorganic or organic acids. The reduction is performed, e.g. with an alkali metal borhydride, for example, sodium or potassium borhydride, which can be used in the theoretical amount or in excess and it is performed in aqueous or aqueous-organic, e.g. aqueous-methanolic, medium at room temperature or moderately elevated temperature.

Starting materials of the general Formula VI are obtained, for example, by reacting reactive functional derivatives of 4-pyridine acetic acid, e.g. the methyl ester, with amines of the general Formula III and subsequently quaternizing with reactive esters of suitable hydroxy compounds, e.g. iodides, bromides, chlorides, sulphates or p-toluene sulphonic acid esters. The quaternization products can be used for further reaction without further purification or, optionally, purified by crystallization.

The compounds of Formula I and their salts with inorganic and organic acids have particularly mild to strong analgesic activity as well as antitussive activity. Accordingly they are administered to warm-blooded animals, especially mammals for the purpose of treating pain and tussive irritation. In contrast to other known analgesics, the instantly claimed compounds have no parasympatholytic properties but rather have a parasympathomimetic action. At the same time, they have surprisingly low toxicity and are suitable, therefore, for the relief and removal of pain of various origin as well as tussive irritation.

The compounds of Formula I and their salts with inorganic and organic acids may be administered orally, rectally and parenterally.

The daily dosages of the free bases or of non-toxic salts thereof vary between 1 and 500 mg. for adult patients. Suitable dosage units such as dragees (sugar coated tablets), tablets, suppositories or ampoules, preferably contain 1–200 mg. of an active substance according to the invention or of a non-toxic salt thereof.

By non-toxic salts of these bases usable according to the invention are meant salts with those acids the anions of which are pharmacologically acceptable in the usual dosages, i.e. those which have no toxic effects. It is also of advantage if the salts to be used crystallize well and are not or are only slightly hygroscopic. As non-toxic salts instead of the free bases, for example, the salts with hydrochloric acid, hydrobromic acid, sulphuric acid, phosphoric acid, methane sulphonic acid, ethane sulphonic acid, β-hydroxyethane sulphonic acid, acetic acid, malic acid, tartaric acid, citric acid, benzoic acid, salicylic acid, phenyl acetic acid, mandelic acid and embonic acid can be used as active substances.

Dosage units for oral administration preferably contain between 0.1% and 90% of a compound of the general Formula I or of a non-toxic salt thereof as active substance. They are produced, for example, by combining the active substance with solid pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate or polyethylene glycols (Carbowaxes) of suitable molecular weights, to form tablets or dragee cores. The latter are coated, e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between varying dosages of active ingredient. Also, for the treatment of coughs, for example, lozenges as well as forms not made up into single dosages such as syrups and drops for example, prepared with the usual auxiliaries can be used.

Dosage units for rectal administration are, e.g. suppositories which consist of a combination of an active substance or a suitable salt thereof with a neutral fatty foundation, or also gelatine rectal capsules which contain a combination of the active ingredient or a non-toxic salt thereof with polyethylene glycols (Carbowaxes) of suitable molecular weight.

Ampoules for parenteral, particularly intra-muscular, administration preferably contain a water soluble salt of an active substance in a concentration of, preferably 0.5–5%, in aqueous solution, optionally together with suitable stabilising agents and buffer substances.

The following prescriptions further illustrate the production of forms for administration according to the invention:

(a) 250 g. of 1-methyl-1,2-,3,6-tetrahydro-4-pyridine acetic acid ethylamide citrate are mixed with 175.80 g. of lactose and 169.70 g. of potato starch. The mixture is moistened with an alcoholic solution of 10 g. of stearic acid and granulated through a sieve. After drying, 160 g. of potato starch, 200 g. of talcum, 2.50 g. of maganesium stearate and 32 g. of colloidal silicon dioxide are mixed in and the mixture is pressed into 10,000 tablets each weighing 100 mg. and containing 25 ml. of active substance (citrate). If desired, the tablets can be grooved for better adaptation of the dosage.

(b) A granulate is prepared from 250 g. of 1-methyl-1,2,3,6-tetrahydro-4-pyridine acetic acid methylamide citrate, 175.90 g. of lactose and the alcoholic solution of 10 g. of stearic acid. After drying, the granulate is mixed with 56.60 g. of colloidal silicium dioxide, 165 g. of talcum, 20 g. of potato starch and 2.50 g. of magnesium stearate and the mixture is pressed into 10,000 dragee cores These are then coated with a concentrated syrup of 522.28 g. of crystallized saccharose, 6 g. of shellac, 10 g. of gum arabic, 215 g. of talcum, 15 g. of colloidal silicium dioxide, 0.22 g. of dyestuff and 1.5 g. of titanium dioxide and dried. The dragees obtained each weigh 145 mg. and contain 25 mg. of active substance.

(c) To prepare a cough syrup, 20 g. of 1-methyl-1,2,3,6 - tetrahydro-4-pyridine acetic acid methylamide citrate, 42 g. of p-hydroxybenzoic acid methyl ester, 18 g. of p-hydroxybenzoic acid propyl ester and 5,000 g. of crystal sugar as well as any flavoring desired are dissolved in distilled water up to 10 litres.

(d) Drops for the treatment of coughs are produced by dissolving 500 g. of 1-methyl-1,2,3,6-tetrahydro-4-pyridine acetic acid methylamide citrate, 10 g. of ascorbic acid, sweetener e.g. 5 g. of sodium cyclamate, flavoring as desired and 2500 g. of 70% sorbitol in distilled water up to 10 liters.

The following non-limitative examples illustrate the production of the compounds according to the invention. The temperatures are given in degrees centigrade.

EXAMPLE 1

17 g. of 1-methyl-1,2,3,6-tetrahydro-4-pyridine acetic acid (produced according to S. M. McElvain and R. E. Lyle, J. Am. Chem. Soc., 72, 384–389 [1950]) are placed in a round flask and 40 ml. of thionyl chloride are added whereupon hydrochloric acid is developed. On completion of the reaction, the mixture is heated for 10 minutes at 30° and then evaporated at 25–30° in a rotary evaporator.

The crude chloride of the above acid which remains is dissolved in 150 ml. of abs. chloroform, the solution is cooled to −60° and 25 ml. of ethylamine are added whereupon the temperature rises to 50°. After stirring for 15 minutes without heating, the reaction mixture is evaporated in vacuo, ice is added to the residue which is then made alkaline with sodium hydroxide solution and extracted with chloroform. The chloroform solution is dried and evaporated. The 1-methyl-1,2,3,6-tetrahydro-4-pyridine acetic acid ethylamide which remains boils at 120°/0.005 torr and can be crystallized from ether, M.P. 72–75°. To prepare the citrate, the base is dissolved in a little acetone, the calculated amount of an acetonic solution of citric acid solution is gradually added and the citrate which precipitates is filtered off, M.P. 139–140°.

The following compounds are produced in an analogous manner:

1-methyl-1,2,3,6-tetrahydro-4-pyridine acetic acid methylamide B.P. 120°/0.01 torr, M.P. 67–68°; citrate M.P 141–142°,
1-methyl-1,2,3,6-tetrahydro-4-pyridine acetic acid propylamide, B.P. 120–125°/0.01 torr, M.P. 55–58°; citrate M.P. 90–92°,
1-methyl-1,2,3,6-tetrahydro-4-pyridine acetic acid dimethylamide B.P. 105–110°/0.02 torr; citrate M.P. 117–118°, maleate M.P. 117°,
1-methyl-1,2,3,6-tetrahydro-4-pyridine acetic acid dimethylamide, B.P. 105–110°/0.01 torr; citrate M.P. 94–96°.

EXAMPLE 2

1 g. of 1-methyl-1,2,3,6-tetrahydro-4-pyridine acetic acid ethyl ester and 3 g. of ethylamine in 16 ml. of abs. ethanol are heated for 4 hours at 120° in a pressure tube. The reaction solution is then evaporated, water is added to the residue, a little 2 N sodium hydroxide solution is added and it is extracted with chloroform. The chloroform solution is dried and concentrated and the residue is distilled. The 1-methyl-1,2,3,6-tetrahydro-pyridine acetic acid ethylamide boils at 120°/0.005 torr, the citrate melts at 139–140°.

EXAMPLE 3

(a) 1 g. of 1-methyl-4-hydroxy-4-pyridine acetic acid ethyl ester (produced by Reformatsky condensation form 1-methyl-4-piperidone and bromoacetic acid ethyl ester with zinc), 0.16 g. of methylamine and 0.269 g. of sodium methylate in 5 ml. of abs. benzene are refluxed for 6 hours. Benzene is then added to the reaction mixture which is then filtered, the filtrate is concentrated and the residue is distilled. The 1-methyl-4-hydroxy-4-piperidine acetic acid methylamide obtained boils at 137°/0.015 torr.

(b) 2.75 g. of the above methylamide are mixed with 1.1 ml. of thionyl chloride in 25 ml. of abs. chloroform whereupon the temperature rises to 50°. The mixture is then refluxed for 15 minutes, ice water is added, it is made alkaline with sodium hydroxide solution and extracted with chloroform. After drying, the chloroform solution is evaporated and the residue is distilled. The 1-methyl-1,2,3,6-tetrahydro-4-pyridine acetic acid methylamide boils at 120°/0.01 torr, the citrate melts at 141–142°; compare Example 1.

EXAMPLE 4

(a) 1 g. of 4-pyridine acetic acid methyl ester and 6 ml. of hexylamine are heated for 4 hours at 150°. After cooling, a little water and a little sodium hydroxide solution are added and it is extracted with chloroform, the extract is dried and concentrated. The 4-pyridine acetic acid hexylamide which remains boils at 210°/0.02 torr (airbath).

(b) 3 g. of the above hexylamide and 10 ml. of methyl iodide in 25 ml. of abs. methanol are refluxed for 3 hours. The crude methoiodide of 4-pyridine acetic acid hexylamide obtained on concentrating is reduced immediately.

(c) 1.05 g. of methoiodide according to (b) and 0.225 g. of sodium borohydride in 3 ml. of water and 0.3 ml. of 1 N sodium hydroxide solution are stirred for 3½ hours at room temperature. The reaction mixture is then extracted with chloroform, the extract is dried and concentrated and the residue is distilled. The 1-methyl-1,2,3,6-tetrahydro-4-pyridine acetic acid hexylamide boils at 180–190°/0.01 torr (airbath).

The following compounds are produced in the same manner:

1 methyl-1,2,3,6-tetrahydro-4-pyridine acetic acid amide, citrate M.P. 152–153°;
1-methyl-1,2,3,6-tetrahydro-4-pyridine acetic acid n-butylamide, maleate M.P. 120°;
1-methyl-1,2,3,6-tetrahydro-4-pyridine acetic acid phenylamide, citrate M.P. 90–92°;
1-(β-phenylethyl)-1,2,3,6-tetrahydro-4-pyridine acetic acid ethylamide, hydrochloride M.P. 136°;
1 - (β-phenylpropyl)-1,2,3,6-tetrahydro-4-pyridine acetic acid ethylamide, hydrochloride M.P. 110–113°;
1-methyl-1,2,3,6-tetrahydro-4-pyridine acetic acid dimethylamide, maleate M.P. 117°;
1-benzyl-1,2,3,6-tetrahydro-4-pyridine acetic acid ethylamide, maleate M.P. 110°;
1-allyl-1,2,3,6-tetrahydro-4-pyridine acetic acid ethylamide, citrate M.P. 78–80°;
1-(n-propyl)-1,2,3,6-tetrahydro-4-pyridine acetic acid ethylamide, hydrochloride M.P. 112°.

What is claimed is:
1. A compound of the formula

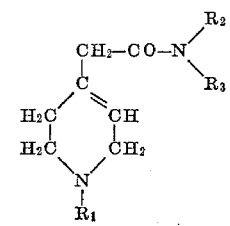

wherein:

$R_1$ is alkyl of at most 4 carbon atoms, alkenyl of from 3 to 4 carbon atoms, or phenylalkyl of at most 10 carbon atoms;

$R_2$ is hydrogen, alkyl of from 1 to 6 carbon atoms or phenyl; and $R_3$ is hydrogen or alkyl of from 1 to 3 carbon atoms, or a pharmaceutically acceptable acid addition salt thereof.

2. A compound as defined in claim 1, wherein $R_1$ is methyl and $R_2$ and $R_3$ are both hydrogen.

3. A compound as defined in claim 1 wherein $R_1$ is methyl, $R_2$ is hydrogen and $R_3$ is ethyl.

4. A compound as defined in claim 1, wherein $R_1$ is methyl, $R_2$ is hydrogen and $R_3$ is methyl.

References Cited

Chemical Abstracts, vol. 65, paragraph 16, 948-b-g (1966).

HENRY R. JILES, Primary Examiner
ALAN L. ROTMAN, Assistant Examiner

U.S. Cl. X.R.

260—294, 294.3; 424—266